(No Model.)
W. H. KNIGHT.
ELECTRIC TRACK SWEEPER.
No. 406,917. Patented July 16, 1889.
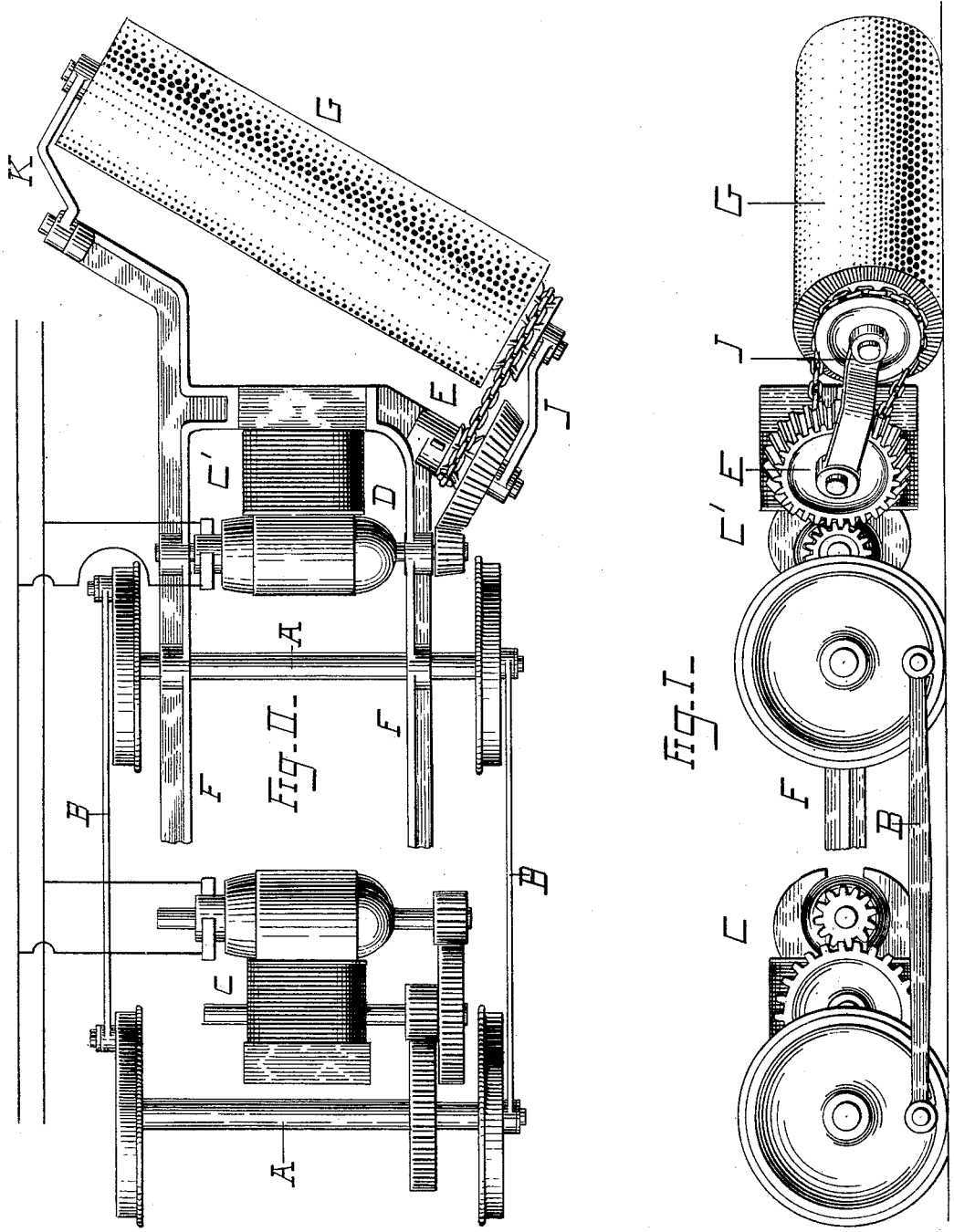
Witnesses
Geo. R. Blodgett
T. O. Blackwell
Inventor
Walter H. Knight
by Bentley & Knight
Attys

UNITED STATES PATENT OFFICE.

WALTER H. KNIGHT, OF NEW YORK, N. Y.

ELECTRIC TRACK-SWEEPER.

SPECIFICATION forming part of Letters Patent No. 406,917, dated July 16, 1889.

Application filed March 5, 1889. Serial No. 301,882. (No model.)

*To all whom it may concern:*

Be it known that I, WALTER H. KNIGHT, a citizen of the United States, residing at New York, in the county of New York and State of New York, have invented certain new and useful Improvements in Electric Track-Sweepers, of which the following is a specification.

My invention relates to track-sweepers for electric railways; and it consists in a vehicle provided with a propelling electric motor and also with an independent motor geared to a rotating broom or cleaning device on the track. It is illustrated in the accompanying drawings, in which—

Figure 1 is a side elevation, and Fig. 2 a plan, of a sweeper involving my invention.

In the drawings, A A' are two axles of a vehicle connected together by parallel rods B B. To one of these axles is geared a motor C, which is mounted upon the truck in any well-known manner. The axle is driven from the armature-shaft by means of rotating gears on the armature and a counter-shaft. Upon the opposite axle of the truck there is mounted a second similar motor C'. This latter motor has a framing F F, extending from its yoke and forming a bearing on the axle, as well as affording journals for the armature-shaft D and counter-shaft E. The counter-shaft in this instance is placed at an angle to the armature-shaft and driven therefrom by means of beveled gears. The framing from the motor is extended to form bearings for the rotating broom G, which is driven by a sprocket-chain from a counter-shaft E. The rotating broom may be raised and lowered in any well-known manner, the arms J and K, in which the broom is journaled, being free to rotate about the axis of counter-shaft E. It will thus be seen that the rotating broom G has its axis at an angle to the track upon which the vehicle runs, and will sweep off any obstruction—such as snow or mud—in a well-known manner.

Both of the motors will be fed from the same source of electricity, either overhead, underground, or storgage-battery, and each will be provided with independent means of regulation, so that either the vehicle itself or the broom may be operated at any desired rate of speed.

What I claim as new, and desire to secure by Letters Patent, is—

1. The combination, with an electrically-propelled vehicle, of a track-sweeper connected thereto, consisting of a rotating broom or cleaning device with an independent operating-motor supplied from the same source as the propelling-motor of the vehicle.

2. The combination, in an electrically-propelled vehicle, of a motor geared to one axle thereof, a mechanical connection with the opposite axle, a rotating broom or cleaning device, and an independent operating-motor for said cleaning device supplied from the same source of electricity as the propelling-motor of the vehicle.

WALTER H. KNIGHT.

Witnesses:
 FRANK SNYDER,
 BUSHROD MORSE.